United States Patent
Baldwin et al.

(10) Patent No.: US 9,773,228 B2
(45) Date of Patent: Sep. 26, 2017

(54) SYSTEMS AND METHODS FOR SHARING IMAGES IN A SOCIAL NETWORK

(71) Applicants: Robert Michael Baldwin, San Francisco, CA (US); Paul François Carduner, San Francisco, CA (US); Andrew Chung, San Francisco, CA (US); Dirk John Stoop, Menlo Park, CA (US)

(72) Inventors: Robert Michael Baldwin, San Francisco, CA (US); Paul François Carduner, San Francisco, CA (US); Andrew Chung, San Francisco, CA (US); Dirk John Stoop, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 556 days.

(21) Appl. No.: 13/668,034

(22) Filed: Nov. 2, 2012

(65) Prior Publication Data
US 2014/0129627 A1    May 8, 2014

(51) Int. Cl.
*G06Q 10/10* (2012.01)
*H04L 29/08* (2006.01)
*G06Q 50/00* (2012.01)

(52) U.S. Cl.
CPC ............ *G06Q 10/10* (2013.01); *G06Q 50/01* (2013.01); *H04L 67/306* (2013.01)

(58) Field of Classification Search
CPC ... H04L 51/32; H04L 12/588; H04L 65/4084; H04L 65/601; H04L 67/10; H04L 67/26; G06F 15/16; G06F 17/30029; G06F 17/30244
USPC ............... 709/204, 203, 206, 207, 217–219, 709/223–226; 715/700–744
See application file for complete search history.

(56) References Cited

U.S. PATENT DOCUMENTS

| | | | |
|---|---|---|---|
| 8,688,782 B1* | 4/2014 | Lin et al. ...................... | 709/204 |
| 2011/0113343 A1* | 5/2011 | Trauth .......................... | 715/738 |
| 2011/0320560 A1* | 12/2011 | Bennett et al. ................ | 709/217 |
| 2012/0110464 A1* | 5/2012 | Chen et al. ................... | 715/738 |
| 2013/0066962 A1* | 3/2013 | Scherzinger et al. ......... | 709/204 |
| 2013/0081083 A1* | 3/2013 | Yu et al. ........................ | 725/40 |

OTHER PUBLICATIONS sunflower16, How can I re-share my friend's Facebook photos, Mar. 6, 2011, Ask MetaFilter, ask.metafilter.com/180145/How-can-I-reshare-my-friends-Facebook-photos.*

\* cited by examiner

*Primary Examiner* — Ruolei Zong
(74) *Attorney, Agent, or Firm* — Baker Botts L.L.P.

(57) ABSTRACT

Techniques to share images in a social networking system. In an embodiment, an image is received from a first user, the image is associated with a first archive of the first user within a social networking system, and the image is associated with a second archive of a second user within the social networking system without the social networking system receiving a request from the second user to download the image. The image may be received from a mobile device. The image may be captured by a camera of a mobile device. The image may be automatically uploaded from a mobile device. A request may be received from the second user to include the image in the second archive associated with the second user. Associating the image with the second archive of the second user may comprise including a link to the image in the second archive.

19 Claims, 11 Drawing Sheets

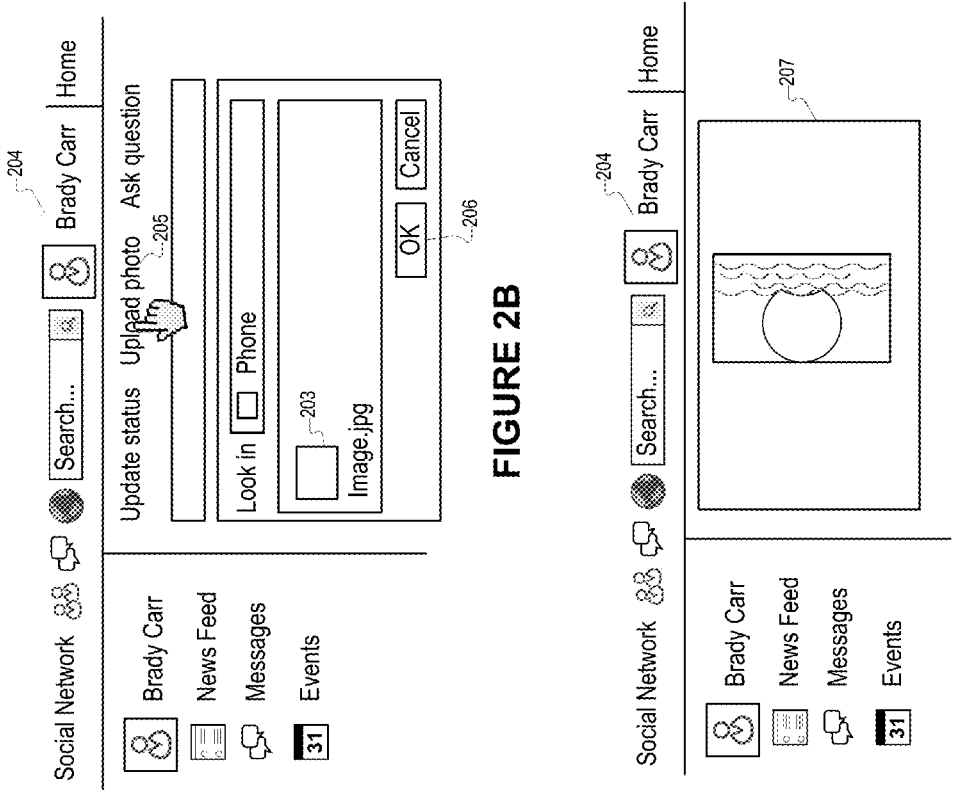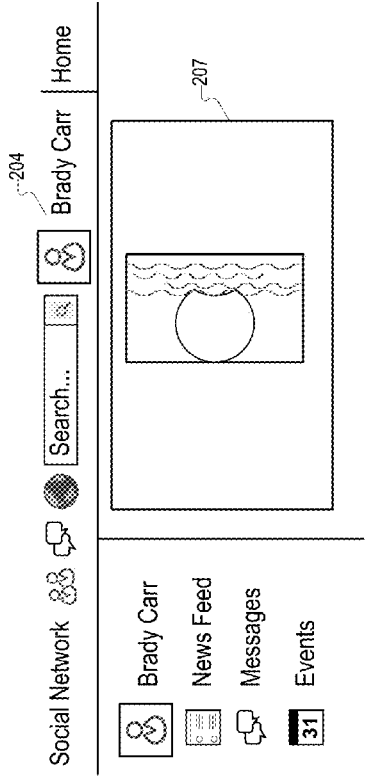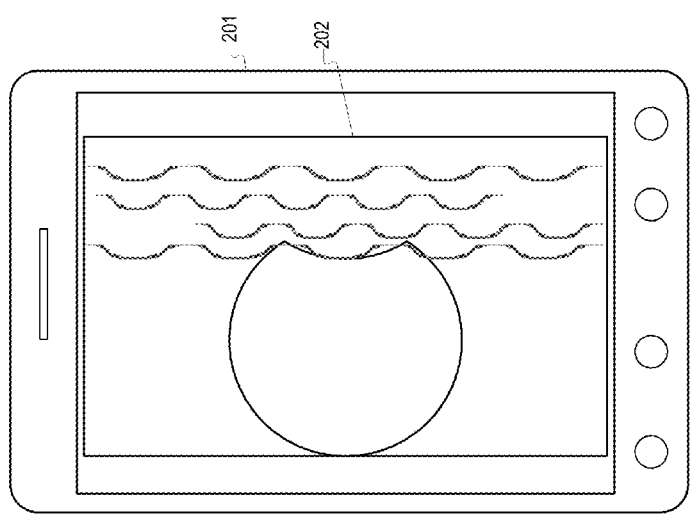

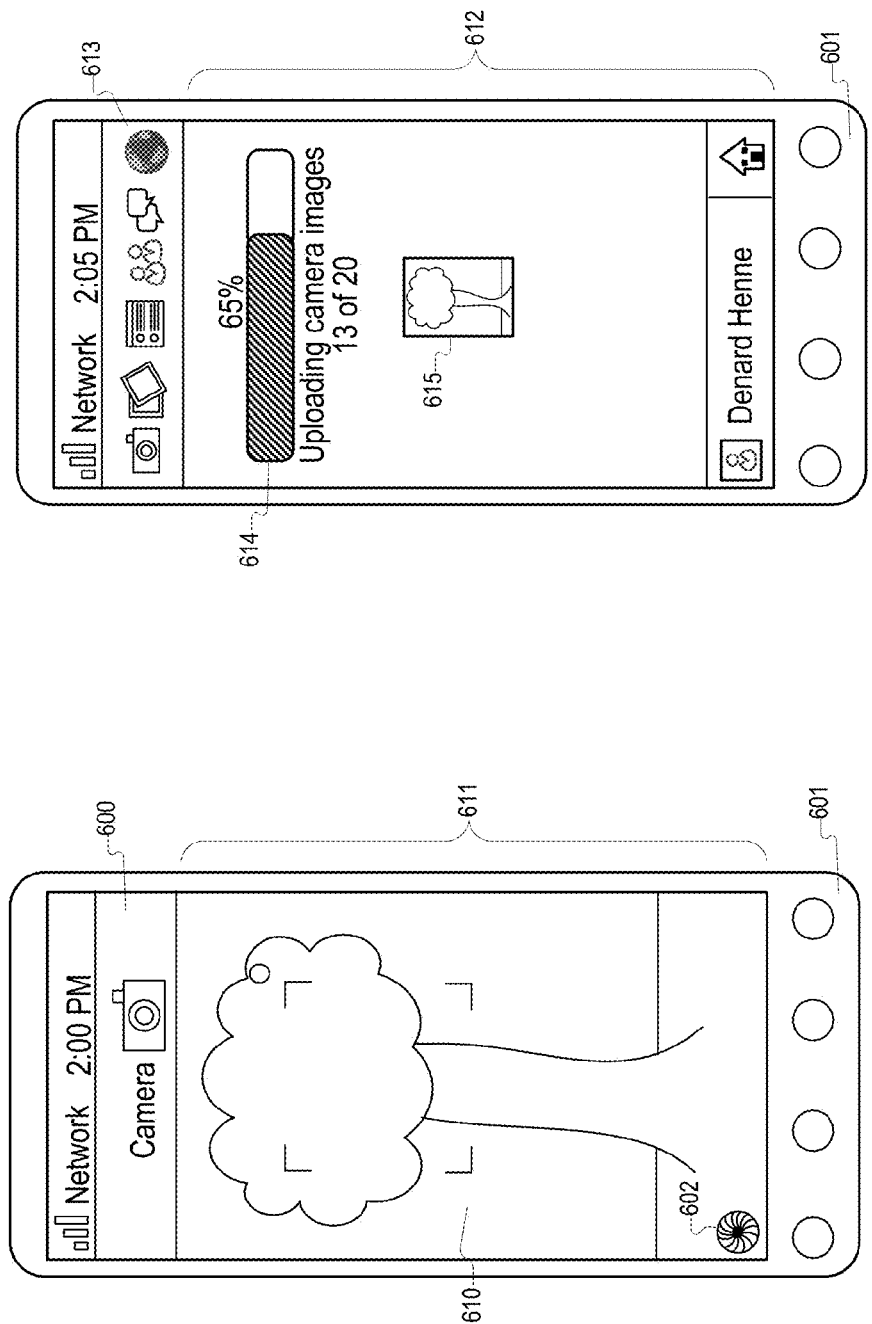

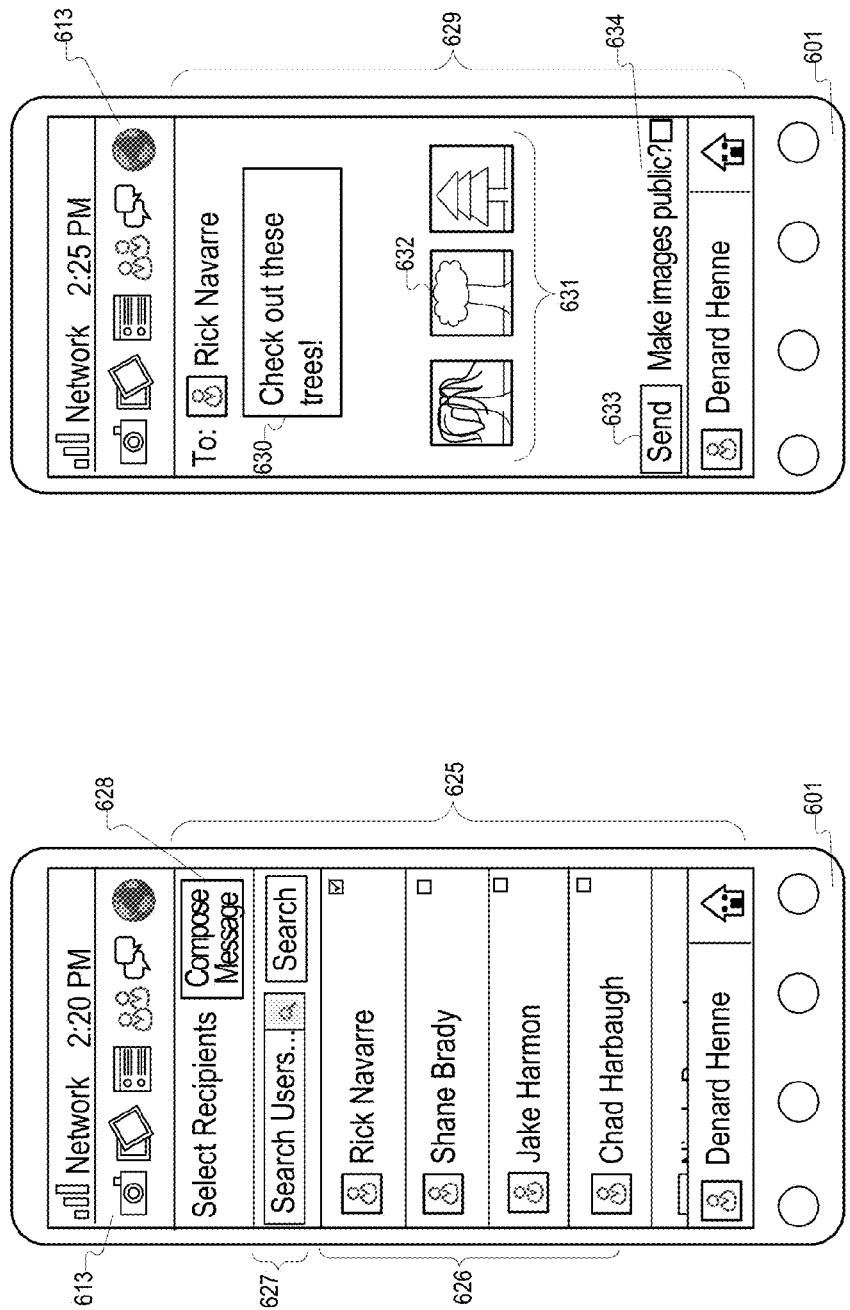

SYSTEMS AND METHODS FOR SHARING IMAGES IN A SOCIAL NETWORK

FIELD OF THE INVENTION

The present invention relates to the field of social networking. More particularly, the present invention provides techniques for uploading and sharing images within a social network.

BACKGROUND

Internet social networks have become a significant phenomenon. Social networks allow an Internet user to create an account and a user profile and interact with other users of the social network. A social network user can gain access to the profile of another user by requesting to add him or her as a friend. Once approved, the "friendship" typically gives both users access to each other's profiles and the content posted on them. Friends' posts may appear as news stories in each other's news feeds, and friends can usually comment on each other's news stories. Social network users typically seek to assemble a group of friends or followers with whom they interact. Information on a user's profile is often only accessible to the user's friends.

Social networks are providing users with increasingly sophisticated functionality. Early social networks offered little more than a simple interface for users to communicate and post messages. Now, on many social networks, users may share numerous different types of content and interact with each other's content in a variety of ways. Content shared on a social network may include digital media such as images. Users may assemble albums that include photographs and other content and share their albums with their friends. In addition, mobile phones that provide sophisticated computing functionality allow users to access social networks from any location. Many phones include built-in cameras, allowing users to capture photos and upload them to social networks with ease. Because of their collaborative nature and growing accessibility, social networks have now become a popular means by which many people share photos and other media content.

SUMMARY

To allow for sharing of images in a social networking system, embodiments of the invention include systems, methods, and computer readable media to facilitate including an image in an archive of a user of the social networking system. An image is received from a first user. The image is associated with a first archive of the first user within a social networking system. The image is associated with a second archive of a second user within the social networking system without receiving a request from the second user to download the image.

In an embodiment, the image may be received from a mobile device. In an embodiment, the image may be captured by a camera of a mobile device. In an embodiment, the image may be automatically uploaded from a mobile device. In an embodiment, the image may be automatically uploaded when a social networking application of a mobile device is running.

In an embodiment, a request may be received by the first user to share the image with the second user. In an embodiment, receiving the request by the first user to share the image with the second user may comprise receiving a tag of the second user. In an embodiment, receiving the request by the first user to share the image with the second user may comprise receiving a message from the first user.

In an embodiment, a request may be received from the second user to include the image in the second archive associated with the second user. In an embodiment, associating the image with the second archive of the second user may comprise including a link to the image in the second archive. In an embodiment, associating the image with the second archive of the second user may comprise creating a copy of the image for the second archive.

In an embodiment, associating the image with the first archive of the first user may comprise including a link to the image in the first archive. In an embodiment, a request may be received to delete the image from the first user. In an embodiment, the link to the image in the first archive may be deleted. In an embodiment, a link to the image in the second archive may be maintained.

In an embodiment, a request may be received from the first user to share the image with a third user subject to privacy settings. In an embodiment, the image may be received from at least one of a photo scanning service and a third party image sharing service. In an embodiment, a notification for the first user may be sent indicating that the image has been associated with the first archive associated with the first user.

Many other features and embodiments of the invention will be apparent from the accompanying drawings and from the following detailed description.

BRIEF DESCRIPTION OF THE DRAWINGS

FIG. 2A illustrates an image captured by a user using a built-in camera of a mobile device in accordance with an embodiment of the invention.

FIG. 2B illustrates the user accessing a user interface to upload the image to the social networking system in accordance with an embodiment of the invention.

FIG. 2C illustrates the image uploaded to the social networking system and displayed within a user interface in accordance with an embodiment of the invention.

FIG. 6A illustrates a camera view within an interface of a camera application on a mobile device in accordance with an embodiment of the invention.

FIG. 6B illustrates an uploading view within an interface of a social networking application on the mobile device in accordance with an embodiment of the invention.

FIG. 6E illustrates a "Select Recipients" view within the interface of the social networking application on the mobile device in accordance with an embodiment of the invention.

FIG. 6F illustrates a compose message view within the interface of the social networking application on the mobile device in accordance with an embodiment of the invention.

DETAILED DESCRIPTION

Social Networking System—General Introduction

Figure 1:
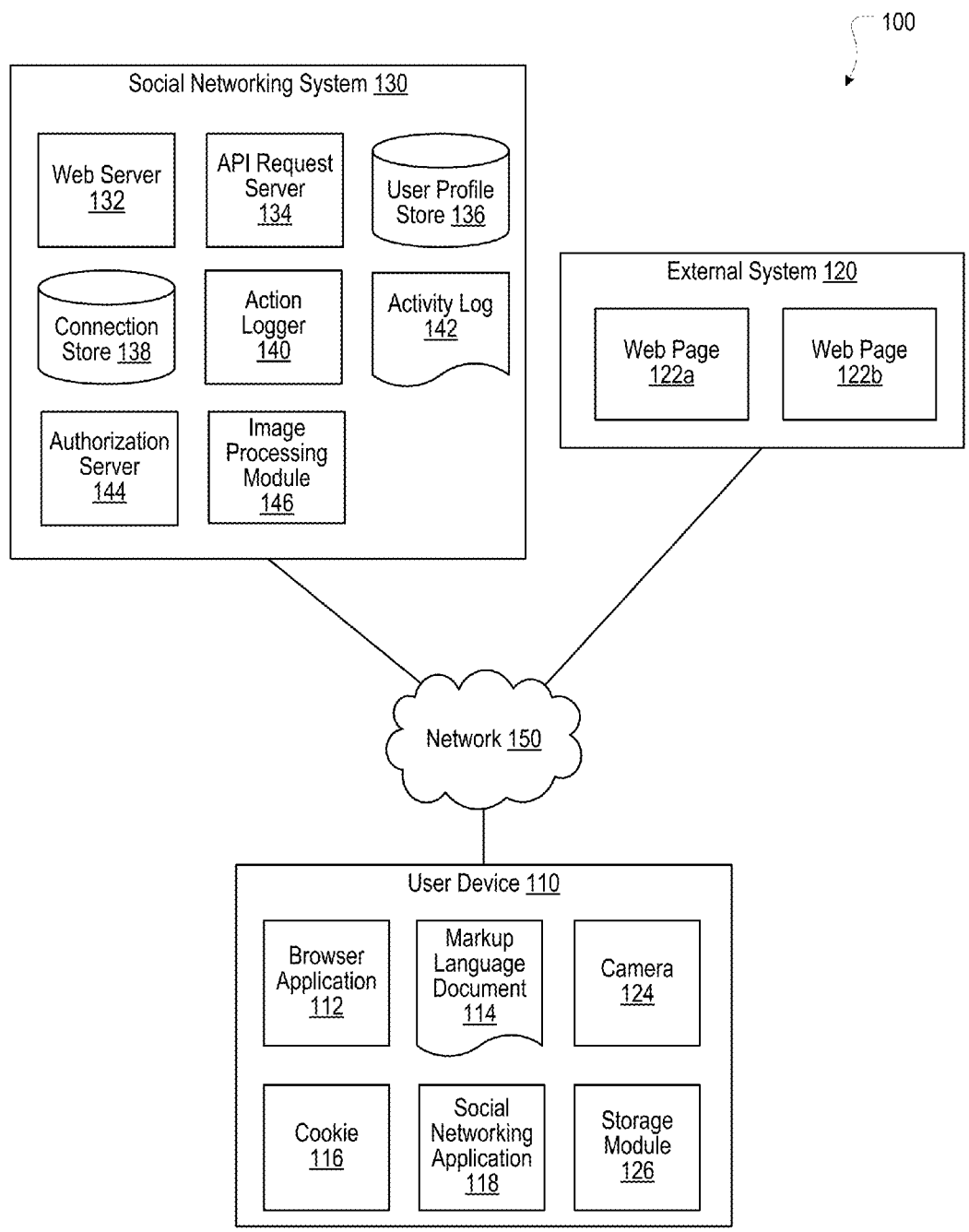
FIG. 1 depicts a system for facilitating the editing of digital images within a social network in accordance with an embodiment of the invention.

FIG. 1 is a network diagram of a system 100 for providing and sharing images within a social network in accordance with an embodiment of the invention. The system 100 includes one or more user devices 110, one or more external systems 120, the social networking system 130, and a network 150. For purposes of illustration, the embodiment of the system 100, shown by FIG. 1, includes a single external system 120 and a single user device 110. However, in other embodiments, the system 100 may include more user devices 110 and/or more external systems 120. In certain embodiments, the social networking system 130 is operated by a social network provider, whereas the external systems 120 are separate from the social networking system 130 in that they may be operated by different entities. In various embodiments, however, the social networking system 130 and the external systems 120 operate in conjunction to provide social networking services to users (or members) of the social networking system 130. In this sense, the social networking system 130 provides a platform or backbone, which other systems, such as external systems 120, may use to provide social networking services and functionalities to users across the Internet.

The user device 110 comprises one or more computing devices that can receive input from a user and transmit and receive data via the network 150. In one embodiment, the user device 110 is a conventional computer system executing, for example, a Microsoft Windows compatible operating system (OS), Apple OS X, and/or a Linux distribution. In another embodiment, the user device 110 can be a device having computer functionality, such as a smart-phone, a tablet, a personal digital assistant (PDA), a mobile telephone, etc. The user device 110 is configured to communicate via the network 150. The user device 110 can execute an application, for example, a browser application that allows a user of the user device 110 to interact with the social networking system 130. In another embodiment, the user device 110 interacts with the social networking system 130 through an application programming interface (API) provided by the native operating system of the user device 110, such as iOS and ANDROID. The user device 110 is configured to communicate with the external system 120 and the social networking system 130 via the network 150, which may comprise any combination of local area and/or wide area networks, using wired and/or wireless communication systems.

In one embodiment, the network 150 uses standard communications technologies and protocols. Thus, the network 150 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 150 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 150 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 110 may display content from the external system 120 and/or from the social networking system 130 by processing a markup language document 114 received from the external system 120 and from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and the social networking system 130. In various embodiments, the markup language document 114 comprises a data file including extensible markup language (XML) data, extensible hypertext markup language (XHTML) data, or other markup language data. Additionally, the markup language document 114 may include JavaScript Object Notation (JSON) data, JSON with padding (JSONP), and JavaScript data to facilitate data-interchange between the external system 120 and the user device 110. The browser application 112 on the user device 110 may use a JavaScript compiler to decode the markup language document 114.

The markup language document 114 may also include, or link to, applications or application frameworks such as FLASH™ or Unity™ applications, the SilverLight™ application framework, etc.

In one embodiment, the user device 110 also includes one or more cookies 116 including data indicating whether a user of the user device 110 is logged into the social networking system 130, which may enable modification of the data communicated from the social networking system 130 to the user device 110. In one embodiment, the user device 110 also includes a social networking application 118, a camera 124, and a storage module 126.

The external system 120 includes one or more web servers that include one or more web pages 122a, 122b, which are communicated to the user device 110 using the network 150. The external system 120 is separate from the social networking system 130. For example, the external system 120 is associated with a first domain, while the social networking system 130 is associated with a separate social networking domain. Web pages 122a, 122b, included in the external system 120, comprise markup language documents 114 identifying content and including instructions specifying formatting or presentation of the identified content.

The social networking system 130 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure.

Users may join the social networking system 130 and then add connections to any number of other users of the social networking system 130 to whom they desire to be connected. As used herein, the term "friend" refers to any other user of the social networking system 130 to whom a user has formed a connection, association, or relationship via the social networking system 130. For example, in an embodiment, if users in the social networking system 130 are represented as nodes in the social graph, the term "friend" can refer to an edge formed between and directly connecting two user nodes.

Connections may be added explicitly by a user or may be automatically created by the social networking system 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral ("two-way"), or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system 130 by Joe, but Joe does not wish to form a mutual connection, a unilateral connection may be established. The connection between users may be a direct connection; however, some embodiments of the social networking system 130 allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (i.e., social networks of people, entities, and concepts) to which users of the social networking system 130 may belong, events or calendar entries in which a user might be interested, computer-based applications that a user may use via the social networking system 130, transactions that allow users to buy or sell items via services provided by or through the social networking system 130, and interactions with advertisements that a user may perform on or off the social networking system 130. These are just a few examples of the items upon which a user may act on the social networking system 130, and many others are possible. A user may interact with anything that is capable of being represented in the social networking system 130 or in the external system 120, separate from the social networking system 130, or coupled to the social networking system 130 via the network 150.

The social networking system 130 is also capable of linking a variety of entities. For example, the social networking system 130 enables users to interact with each other as well as external systems 120 or other entities through an API, a web service, or other communication channels. The social networking system 130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 130. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 130 modifies edges connecting the various nodes to reflect the relationships and interactions.

The social networking system 130 also includes user-generated content, which enhances a user's interactions with the social networking system 130. User-generated content may include anything a user can add, upload, send, or "post" to the social networking system 130. For example, a user communicates posts to the social networking system 130 from a user device 110. Posts may include data such as status updates or other textual data, location information, images such as photos, videos, links, music or other similar data and/or media. Content may also be added to the social networking system 130 by a third-party. Content "items" are represented as objects in the social networking system 130. In this way, users of the social networking system 130 are encouraged to communicate with each other by posting text and content items of various types of media through various communication channels. Such communication increases the interaction of users with each other and increases the frequency with which users interact with the social networking system 130.

The social networking system 130 includes a web server 132, an API request server 134, a user profile store 136, a connection store 138, an action logger 140, an activity log 142, an authorization server 144, and an image processing module 146. In an embodiment of the invention, the social networking system 130 may include additional, fewer, or different components for various applications. Other components, such as network interfaces, security mechanisms, load balancers, failover servers, management and network operations consoles, and the like are not shown so as to not obscure the details of the system.

The user account store 136 maintains information about user accounts, including biographic, demographic, and other types of descriptive information, such as work experience, educational history, hobbies or preferences, location, and the like that has been declared by users or inferred by the social networking system 130. This information is stored in the user account store 136 such that each user is uniquely identified. The social networking system 130 also stores data describing one or more connections between different users in the connection store 138. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, buckets, cluster centers, images, interests, pages, external systems, concepts, and the like are also stored in the connection store 138.

The social networking system 130 maintains data about objects with which a user may interact. To maintain this data, the user account store 136 and the connection store 138 store instances of the corresponding type of objects maintained by the social networking system 130. Each object type has information fields that are suitable for storing information appropriate to the type of object. For example, the user account store 136 contains data structures with fields suitable for describing a user's account and information related to a user's account. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user account store 136, assigns a unique identifier to the user account, and begins to populate the fields of the user account with information provided by the user.

The connection store 138 includes data structures suitable for describing a user's connections to other users, connections to external systems 120 or connections to other entities. The connection store 138 may also associate a connection type with a user's connections, which may be used in conjunction with the user's privacy setting to regulate access to information about the user. In an embodiment of the invention, the user account store 136 and the connection store 138 may be implemented as a federated database.

Data stored in the connection store 138, the user account store 136, and the activity log 142 enables the social networking system 130 to generate the social graph that uses nodes to identify various objects and edges connecting nodes to identify relationships between different objects. For example, if a first user establishes a connection with a second user in the social networking system 130, user accounts of the first user and the second user from the user account store 136 may act as nodes in the social graph. The connection between the first user and the second user stored by the connection store 138 is an edge between the nodes associated with the first user and the second user. Continuing this example, the second user may then send the first user a message within the social networking system 130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented as a node in the social networking system 130. This tagging action may create edges between the first user and the second user as well as create an edge between each of the users and the image, which is also a node in the social graph. In yet another example, if a user confirms attending an event, the user and the event are nodes obtained from the user account store 136, where the attendance of the event is an edge between the nodes that may be retrieved from the activity log 142. By generating and maintaining the social graph, the social networking system 130 includes data describing many different types of objects and the interactions and connections among those objects, providing a rich source of socially relevant information.

The web server 132 links the social networking system 130 to one or more user devices 110 and/or one or more external systems 120 via the network 150. The web server 132 serves web pages, as well as other web-related content, such as Java, JavaScript, Flash, XML, and so forth. The web server 132 may include a mail server or other messaging functionality for receiving and routing messages between the social networking system 130 and one or more user devices 110. The messages can be instant messages, queued messages (e.g., email), text and SMS messages, or any other suitable messaging format.

The API request server 134 allows one or more external systems 120 and user devices 110 to call access information from the social networking system 130 by calling one or more API functions. The API request server 134 may also allow external systems 120 to send information to the social networking system 130 by calling APIs. The external system 120, in one embodiment, sends an API request to the social networking system 130 via the network 150, and the API request server 134 receives the API request. The API request server 134 processes the request by calling an API associated with the API request to generate an appropriate response, which the API request server 134 communicates to the external system 120 via the network 150. For example, responsive to an API request, the API request server 134 collects data associated with a user, such as the user's connections that have logged into the external system 120, and communicates the collected data to the external system 120. In another embodiment, the user device 110 communicates with the social networking system 130 via APIs in the same manner as external systems 120.

The action logger 140 is capable of receiving communications from the web server 132 about user actions on and/or off the social networking system 130. The action logger 140 populates the activity log 142 with information about user actions, enabling the social networking system 130 to discover various actions taken by its users within the social networking system 130 and outside of the social networking system 130. Any action that a particular user takes with respect to another node on the social networking system 130 may be associated with each user's account, through information maintained in the activity log 142 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 130, the action is recorded in the activity log 142. In one embodiment, the social networking system 130 maintains the activity log 142 as a database of entries. When an action is taken within the social networking system 130, an entry for the action is added to the activity log 142. The activity log 142 may be referred to as an action log.

Additionally, user actions may be associated with concepts and actions that occur within an entity outside of the social networking system 130, such as an external system 120 that is separate from the social networking system 130. For example, the action logger 140 may receive data describing a user's interaction with an external system 120 from the web server 132. In this example, the external system 120 reports a user's interaction according to structured actions and objects in the social graph.

Other examples of actions where a user interacts with an external system 120 include a user expressing an interest in an external system 120 or another entity, a user posting a comment to the social networking system 130 that discusses an external system 120 or a web page 122a within the external system 120, a user posting to the social networking system 130 a Uniform Resource Locator (URL) or other identifier associated with an external system 120, a user attending an event associated with an external system 120, or any other action by a user that is related to an external system 120. Thus, the activity log 142 may include actions describing interactions between a user of the social networking system 130 and an external system 120 that is separate from the social networking system 130.

The authorization server 144 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entities to comprise an enumeration of entities. For example, the user may provide a list of external systems 120 that are allowed to access certain information. Another embodiment allows the specification to comprise a set of entities along with exceptions that are not allowed to access the information. For example, a user may allow all external systems 120 to access the user's work information, but specify a list of external systems 120 that are not allowed to access the work information. Certain embodiments call the list of exceptions that are not allowed to access certain information a "block list". External systems 120 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 144 contains logic to determine if certain information associated with a user can be accessed by a user's friends, external systems 120, and/or other applications and entities. The external system 120 may need authorization from the authorization server 144 to access the user's more private and sensitive information, such as the user's work phone number. Based on the user's privacy settings, the authorization server 144 determines if another user, the external system 120, an application, or another entity is allowed to access information associated with the user, including information about actions taken by the user.

The image processing module 146 of the social networking system 130 and the social networking application 118 of the user device 110 may provide image management capabilities. In an embodiment, the image processing module 118 receives images captured by a camera 124 within the user device 110 or provided to the user device 110 from another source. The images may be saved to a storage module 126 within the user device 110. The social networking application 118 or the operating system of the user device 110 may upload images to the social networking system 130, where they may be saved to an archive of a user by the image processing module 146. The image processing module 146 may also include images in archives of multiple users in response to requests to share images received from users of the social networking system 130.

Sharing Images in a Social Network

Users may take advantage of the collaborative features and functionality of the social networking system 130 to upload and share digital images. Users of the social networking system 130 may upload images for display on their user profiles. For example, a user of the social networking system 130 may upload a profile picture that features prominently on her profile and identifies her to friends and other users. A user may also upload a cover image that may be displayed as a banner across the top of the user's profile. In addition to images for display on user profiles, users may also upload images for sharing with other users, such as photographs of an event, artwork, professional photography portfolios, photographs from nature, or any other type of digital images. Images uploaded by users may be published on their profile pages or in their news feeds, or on the profile pages or in the news feeds of other users. Users may publish uploaded images on the profile pages of other users by tagging the other users within the images or posting the images to the wall of the other users. A tag is an association of an image with a user that, for example, indicates that the user appears in the image. When a user is tagged in an image, the image is associated with the user and may be included in an album or other user-specified grouping of images of the user, a profile page of the user, a news feed of the user, etc.

FIGS. 2A-2C illustrate online image sharing functionality of the social networking system 130 in accordance with an embodiment of the invention. FIG. 2A illustrates an image 202 captured by a user (e.g., "Brady Carr") with the built-in camera of a mobile device 201. The mobile device 201 may be a smartphone, a tablet device, a laptop computer with a built-in camera, or other user device 110. Alternatively, the image 202 may be taken with a dedicated camera (not pictured) and transferred to a user device such as a laptop computer or a desktop computer. FIG. 2B illustrates a user interface 204 for uploading the image 202 to the social networking system 130. An "upload" option 205 within the user interface 204 may be selected that prompts the user to browse to the location of the image 202 on the local storage of the mobile device 201. An "OK" option 206 may be selected when the image 202 is located. In an embodiment, the image 202 may be automatically uploaded to the social networking system 130. FIG. 2C illustrates the image 202 within the user interface 204 after it has been uploaded to the social networking system 130.

With the advent of mobile devices that include built-in cameras and connect to wireless data networks, photo sharing has become an increasingly prominent feature of social networking systems. In FIGS. 2A-2C, Brady Carr previously may have shared the image 202 by capturing the image 202 with a digital camera, transferring the image 202 from the digital camera to a computer using a wired connection, and uploading the image 202 from the computer to the social networking system 130 through a sequence of manual inputs to the user interface 204. To obviate these manual inputs, an operator of the social networking system 130 may provide the social networking application 118 for the mobile device that allows the user to easily upload images directly from the mobile device. In an embodiment, functionality for uploading images to the social networking system 130 may also be built into an operating system of the mobile device. Because people may carry camera-enabled mobile devices such as smartphones with them more often than they carry dedicated cameras, they may have ample opportunities to capture images and share them. While a mobile device may be discussed herein as an example, it is to be understood that the embodiments of the invention may be performed with any type of user device 110, such as mobile phones, tablets, notebooks, laptop computers, desktop computers, etc.

Images may be created or stored in the user device 110 in a number of different ways. For example, images may be captured and stored in a mobile device using the built-in camera of the mobile device. Images may be captured from within a dedicated camera application on the mobile device or from within the social networking application 118 on the mobile device. Images captured by the camera may be stored in a local storage module within the mobile device, such as the storage module 126, for later use. Captured images stored in the storage module 126 may collectively be referred to as a "camera roll". Images captured by the camera, or other images stored in the storage module 126 within the mobile device, may be uploaded to the social networking system 130 using the social networking application 118 or using image uploading functionality built in to the operating system of the mobile device. In an embodiment, the camera application may be initialized separately from the social networking application 118, and an option to upload images to the social networking system 130 using the social networking application 118 or the operating system of the mobile device may be selected from within the camera application. In an embodiment, the camera may be accessed from within the social networking application 118.

According to an embodiment of the invention, images that are stored on the user device 110 may be automatically uploaded to the social networking system 130. For example, an image captured using the built-in camera of a mobile device may be automatically uploaded to the social networking system 130 immediately upon being captured or at a later time. Automatic uploading by the social networking application 118 or the operating system of the user device 110 may be implemented in different ways. In an embodiment, the social networking application 118 or the operating system of the user device 110 may automatically upload images in the storage module 126 to the social networking system 130 without any action by the user. In an embodiment, a filter or process may be applied to the image before the image is automatically uploaded to the social networking system 130. For example, the filter or process may compress the image, alter the appearance of the image, change the file format of the image, apply a visual effect to the image, or otherwise modify the image. In an embodiment, the user device 110 may upload a higher-resolution, lower-resolution, or original resolution version of the image to the social networking system 130. In an embodiment, not every image captured by the user device 110 may be automatically uploaded to the social networking system 130. Rather, images may be selectively uploaded to the social networking system 130 based on preferences of the social networking system 130, the user, or both. In an embodiment, the automatic uploading may be performed in the background while the user is not actively using the social networking application 118. The user may choose to disable automatic uploading to limit battery consumption or memory usage. In an embodiment, the automatic uploading may be activated when the social networking application 118 is accessed. The user device 110 may detect that a new image has been stored in the user device 110, verify that the new image is not already saved in the social networking system 130, and upload the new image to the social networking system 130. In an embodiment, the social networking system 130 may detect that a new image has been captured by monitoring designated locations for captured images on the user device 110. For example, the social networking system 130 may monitor locations on a mobile device in which the mobile device operating system stores images that were captured using the built-in camera of the mobile device. In an embodiment, the images may be uploaded in a batch operation at designated time intervals or when certain conditions are met, such as when network signal quality or data transfer rates reach pre-determined levels. In an embodiment, the automatic uploading functionality may be configured and performed according to settings specified by the user or the social networking system 130. The settings may include privacy settings of the user. The settings may dictate when and how images are both uploaded from the user device 110 to the social networking system 130 and shared therein. For example, the user may specify criteria to selectively allow uploading of certain images to the social networking system 130 while prohibiting uploading of other images. As another example, the user may specify criteria to selectively allow sharing of certain images within the social networking system 130 while prohibiting sharing of other images. In this regard, for images intended for sharing, the user may further specify criteria to limit access to a shared image to certain locations within the social networking system 130 or to certain users of the social networking system 130.

The social networking application 118 or the operating system of the user device 110 may delay or disable automatic uploading in some circumstances. According to an embodiment of the invention, if an image that had previously been uploaded to the social networking system 130 is deleted from the social networking system 130, the deletion may indicate a desire of the user not to maintain the image. Based on such a desire, the image may be withheld from being re-uploaded to the social networking system 130.

In an embodiment, if an image that previously had been uploaded to the social networking system 130 is deleted from the user device 110, the image may be retained on the social networking system 130. Unlike deletion of the image from the social networking system 130, deletion of the image from the user device 110 may not necessarily indicate a desire of the user not to maintain the image. Rather, the user may have deleted the image from the user device 110, for example, to conserve space in the local storage of the user device 110 or for some other purpose. Despite such a deletion, the user still may wish to retain a copy of the image elsewhere. Because storage space available on the user device 110 may be more limited than storage space available within the social networking system 130, the user may choose to delete the image from the user device 110 and retain the image within the social networking system 130. In an embodiment, a setting may be provided, for example, by the social networking application 118 or the operating system of the user device 110 to allow automatic deletion of an image from the user device 110 after the image has been uploaded to the social networking system 130. The setting may allow the user to select one or more images, or types of images, to be automatically deleted upon upload. Such automatic deletion may conserve storage capacity on the user device 110.

In order to prevent the re-uploading of images that have already been uploaded to the social networking system 130, identical, or similar, images may need to be uniquely identified and matched. For example, in order for the user device 110 to detect the deletion of an image from the social networking system 130 and refrain from re-uploading the image to the social networking system 130, the social networking system 130 may need to retain a fingerprint of the image as an indication that the image was already uploaded to the social networking system 130. A fingerprint of an image may uniquely identify the image on the social networking system 130.

According to one embodiment of the invention, it may be determined that an image has already been uploaded to the social networking system 130 by matching the fingerprint of the image with a fingerprint stored within the social networking system 130. In an embodiment, the user device 110 may generate a fingerprint of an image when the image is stored on the user device 110. The social networking system 130 may generate a fingerprint of the image when the image is uploaded to the social networking system 130. When the user deletes the image from the social networking system 130, the social networking system 130 may remove the image but retain the fingerprint. When image uploading functionality of the user device 110 is activated, the user device 110 may determine that the image already has been uploaded to the social networking system 130 by comparing the fingerprint stored in the user device 110 with the fingerprint stored in the social networking system 130.

In an embodiment, the social networking system 130 alone may generate a fingerprint of the image when it is uploaded to the social networking system 130. The user device 110 may lack the capability to create a fingerprint of the image and may upload the image irrespective of whether the image has previously been uploaded to the social networking system 130. For example, the user device 110 may be an older mobile device with limited processing power. Upon receiving the image, the social networking system 130 may create a fingerprint of the image, compare the fingerprint with the fingerprints of images previously uploaded to the social networking system 130, and discard the image if its fingerprint matches the fingerprint of a previously uploaded image.

According to one embodiment of the invention, the social networking system 130 may create a fingerprint of an image using perceptual image hashing techniques. Perceptual image hashing techniques may rely on functions that generate hash values based on the characteristics of an image. A perceptual image hash function may take as input an image and generate as output a fixed-length or other type of vector known as a hash value. The hash value of an image may serve as the fingerprint of the image. Retaining the hash value of an image as a fingerprint of the image may consume significantly less storage space than retaining a binary image file.

According to one embodiment of the invention, the social networking system 130 may create a fingerprint of an image using a histogram analysis. An image histogram is a graphical representation of the tonal distribution within a digital image. A histogram analysis may determine the distribution of the various colors and hues within an image and generate a graph representing the distribution. In one type of histogram, the horizontal axis may represent the tonal variations within an image and the vertical axis may represent the number of pixels that comprise each tone within the image. The histogram of an image may serve as the fingerprint of the image. As with a hash value, retaining the histogram of an image may consume significantly less storage space than retaining a binary image file.

According to an embodiment of the invention, the social networking system 130 may identify identical, or similar, images using fingerprints supplemented with metadata of the images. Comparing the fingerprints along with metadata of two images may help identify identical images to a threshold degree of certainty. Metadata of an image may include a timestamp, a file size, information about the lens or camera settings used to capture the image, or any other data pertaining to an image. As discussed above, an image may be deleted from the social networking system 130, the user device 110, or both. In an embodiment, certain metadata of the image may be retained by the social networking system 130 after the image is deleted from the social networking system 130. A fingerprint and metadata of an image received by the social networking system 130 may be compared with the fingerprints and metadata stored within the social networking system 130 to determine if the image was previously uploaded to the social networking system 130. Determination and matching of identical images may be facilitated by any suitable image or file synchronization technique in addition to or apart from fingerprinting.

The social networking system 130 may utilize image matching techniques to replace one version of an image with another version of the image. For example, a lower resolution version of an image may be uploaded to the social networking system 130. Later, a higher resolution version of the image may be uploaded to the social networking system 130. The social networking system 130 may use an image hashing or histogram function to generate fingerprints of the images. By comparing a fingerprint of the lower resolution version of an image with a fingerprint of a higher resolution version of the image, the social networking system 130 may determine that the versions are related and associate the versions with each other. In an embodiment, based on the association, the social networking system 130 may replace the lower resolution version with the higher resolution version. In an embodiment, such replacement may occur within an archive of a user of the social networking system 130.

A user device 110 may be used by multiple users to access the social networking system 130. In an embodiment, one user may be designated as the owner of the user device 110, and images stored in the user device 110 may be uploaded to the social networking system 130 and made accessible only to the owner of the user device 110. In an embodiment, the social networking application 118 or the operating system of the user device 110 may include an option to enable automatic uploading of images to the social networking system 130 on WiFi only, enable automatic uploading of images to the social networking system 130 on WiFi and cellular data networks, or disable automatic uploading of images to the social networking system 130 entirely.

According to an embodiment of the invention, images captured by the user may be uploaded to an archive of the user on the social networking system 130. In an embodiment, the archive may be maintained in a repository, such as the user profile store 136 or other storage of the social networking system 130. The archive of the user may serve as a destination for images uploaded to the social networking system 130 by the user. In an embodiment, images uploaded to the social networking system 130 by the user from any source may be included within the archive. The archive of the user on the social networking system 130 may only be accessible to the user. However, the user may grant access to individual images, user-defined groups of images, or albums within the archive to other users of the social networking system 130 by sharing them with the users. In an embodiment, images uploaded from a user's mobile device to the social networking system 130 may be saved within a "camera roll" subsection of the archive of the user. In an embodiment, images uploaded from a user's mobile device to the social networking system 130 may be saved within a "camera roll" section separate from the archive of the user, and the user may be presented with the option to save the images to the archive. In an embodiment, there may be a separate "camera roll" section or subsection within the social networking system 130 for each of the user's devices from which images are uploaded to the social networking system 130. In an embodiment, a user may add an image in his archive to one or more photo albums. A photo album is a collection of images associated with a user that may have its own privacy and sharing settings. In an embodiment, images may be received from a third party image sharing service or a print photograph scanning service and automatically included in a user's archive.

According to an embodiment of the invention, a user may share images that he has saved to his archive with other users of the social networking system 130. The social networking system 130 may allow users to share photographs or photo albums with other users of the social networking system 130. A user may designate an image as "public" such that the image is accessible to all users of the social networking system 130 or all users of the Internet irrespective of whether they have accounts on the social networking system 130. The user may designate the image as "private" and grant access to the image only to certain users of the social networking system 130 by sharing the image with them. An image may be shared by a first user of the social networking system 130 with a second user of the social networking system 130 in a number of ways. The first user, for example, may upload the image to the social networking system 130 and tag the second user in the image. The second user may receive an indication that he has been tagged in the image uploaded by the first user and may be able to view the image based on the tag. The first user also may share an image with the second user by sending a message to the second user containing a link to the image. Any technique for sharing an image between users of the social networking system 130 may be used. In an embodiment, when the first user shares the image with the second user, the image may automatically be included in an archive of the second user. In an embodiment, the image may be included in a selected album within the archive of the second user. In an embodiment, the sharing of the image may appear as a story within a news feed of the first user, the second user, another user, or a combination thereof. As discussed below, a user may receive a notification when the image is added to the user's archive.

According to an embodiment of the invention, when the second user is viewing the image in an interface of the social networking system 130, he may select an option to save the image to his archive on the social networking system 130. The image may be an image that the first user has made accessible to all of his friends or to all users of the social networking system 130. The image may be an image that the first user has posted to the first user's profile, causing it to appear in a news feed of the second user. This embodiment avoids the need for the second user to download the image to his device and re-upload the image to his own archive within the social networking system 130. Additionally, this embodiment ensures that the second user will have persistent access to the image.

When the second user selects the option to save the image to his own archive, the social networking system 130 may make the image accessible to the second user within his own archive irrespective of whether the image is present or accessible from the profile of the first user. The first user may, in the future, remove the image, remove the second user from his friends list, deactivate his account within the social networking system 130, or perform any other action that may affect the availability of the image to the second user. If the second user does not save the image to his own archive, the second user may lose access to the image when the first user removes the image, removes the second user from his friends list, or deactivates the first user's account.

According to an embodiment of the invention, when the image is uploaded to the social networking system 130, the social networking system 130 may create a link (e.g., a URL, a pointer, etc.) or other reference to the image in the archive of the first user. In an embodiment, when the first user shares the image with the second user or the second user selects an option to save the image to his archive, the social networking system 130 may create a link to the image in the archive of the second user. In this manner, the social networking system 130 may maintain one file for an image when the image is associated with the archives of many users. When the first user or the second user accesses functionality to remove the image or deactivates his account, the social networking system 130 may delete the link to the image from the archive of the first user or the second user, respectively. In another embodiment, the social networking system 130 may maintain a separate copy of the image for each archive in which the image is included. The social networking system 130 may create a copy of the image when the image is included in a user's archive. When the user accesses functionality to remove the image from his archive or deactivates his account, the social networking system 130 may delete the copy of the image. Thus, as used herein with respect to the association of images with archives, to "include" an image in an archive, to place an image "within" in archive, or the like may refer to storage of a link to the image file in a repository, storage of an image file in a repository, or storage of a copy of an image file in a repository.

According to an embodiment of the invention, when an image is included in the archive of a user of the social networking system 130, the user may receive a notification indicating that the image is available for viewing in his archive. The user may access his archive and share images in his archive, collectively or individually, with other users. Allowing users to share images with other users of the social networking system 130 and save shared images to an archive within the social networking system 130 avoids the need to use potentially cumbersome and unsecure technologies such as email or third party upload services to share images.

According to an embodiment of the invention, a user may share images and specify privacy settings that restrict the manner in which the shared images may be accessed by the users with whom they were shared. In an embodiment, a first user may select an option that protects a shared image and thereby prevents a second user from saving the shared image to his archive. The second user may be able to view the image, but may not be able to save the image to his archive. The first user may protect some or all images in his archive. The first user may protect an image from specific users such that some users with whom the image has been shared may be presented with an option to save the image to their archives while other users with whom the image has been shared may not be presented with an option to save the image to their archives.

According to an embodiment of the invention, the social networking system 130 may receive and include images from third party sources in an archive of a user. Third party sources may include photo scanning services, photo sharing services, or any services external to the social networking system 130 that handle images for the user. A photo scanning service may be a service that digitizes print photographs provided by a user to the photo scanning service. A photo sharing service may be an online service dedicated to hosting digital images. The user may give the social networking system 130 permission to accept images from the third party sources into the archive of the user. For example, the user may take his print photographs to a kiosk or other type of photo scanning service for digitization, whether automated or not. The user may provide the photo scanning service with a unique identifier of the user's account on the social networking system 130, such as a username. When the photo scanning service finishes digitizing the user's print photographs, the photo scanning service may send the digitized images to the user's archive based on the unique identifier provided to the photo scanning service.

Figure 3:
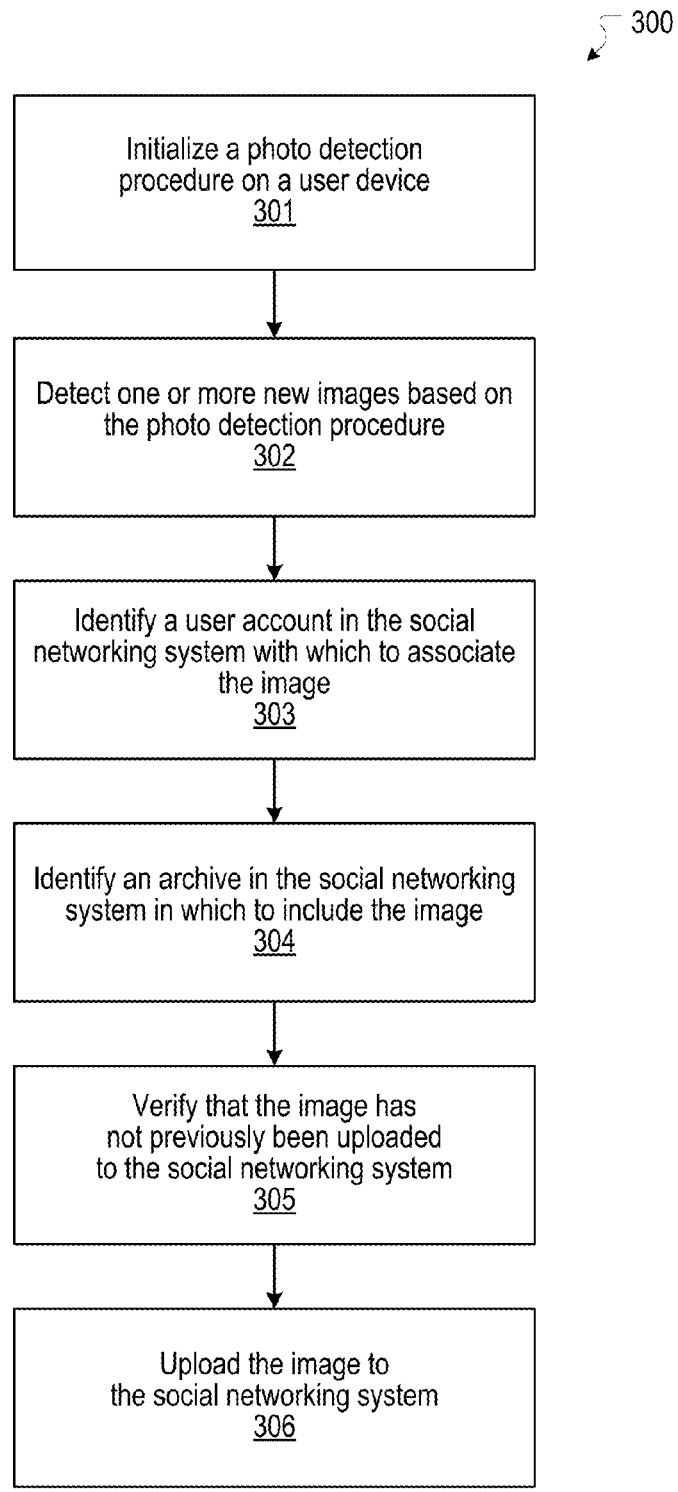
FIG. 3 illustrates a process for automatically uploading an image from a mobile device to the social networking system in accordance with an embodiment of the invention.

FIG. 3 illustrates a process 300 for automatically uploading an image from a user device 110 to the social networking system 130. In an embodiment, the user device 110 may be a mobile device. At block 301, the user device 110 initializes a photo detection procedure on the user device 110. The photo detection procedure may monitor the storage module 126 for new images. The photo detection procedure may be initialized by the social networking application 118 or by the operating system of the user device 110. In an embodiment, the photo detection procedure may run in the background on the user device 110. In an embodiment, the photo detection procedure may run when the social networking application 118 is accessed by the user. In an embodiment, the photo detection procedure may be optional. At block 302, the user device 110 detects one or more new images based on the photo detection procedure. At block 303, the user device 110 identifies a user account in the social networking system 130 with which to associate the image. At block 304, the user device 110 identifies an archive in the social networking system 130 in which to include the image. In an embodiment, the user may specify an album or other location within his archive to which the image should be added. In an embodiment, the user device 110 may identify the archive of the user whose account is accessed using the user device 110. In an embodiment, the user device 110 may identify the archive of the user who is designated as the owner of the user device 110. The social networking system 130 may determine a location with which to associate the image based on the identification of the user account and the archive received from the user device 110. At block 305, the user device 110 verifies that the image has not previously been uploaded to the social networking system 130. The verification may be performed using a suitable synchronization technique. In an embodiment, if the image is not present in the social networking system 130, the user device 110 may verify that the user has not removed the image from his archive. In an embodiment, verification may be optional. Determination of whether to perform the verification may be based on available bandwidth, the time of day, a preference setting of the user, the amount of available storage space on the user device 110, the capabilities of the user device 110, or any other factor. In an embodiment, verification may be performed after the image has been uploaded to the social networking system 130. At block 306, the user device 110 uploads the image to the social networking system 130. As discussed above, settings provided by the user or the social networking system 130 may specify rules for publishing and sharing the image. For example, based on the settings, the uploaded image may be automatically published to one or more pages of the social networking system 130, including, for example, a user profile, a news feed, a timeline, etc. As another example, based on the settings, the uploaded image may not be automatically published within the social networking system 130.

Figure 4:
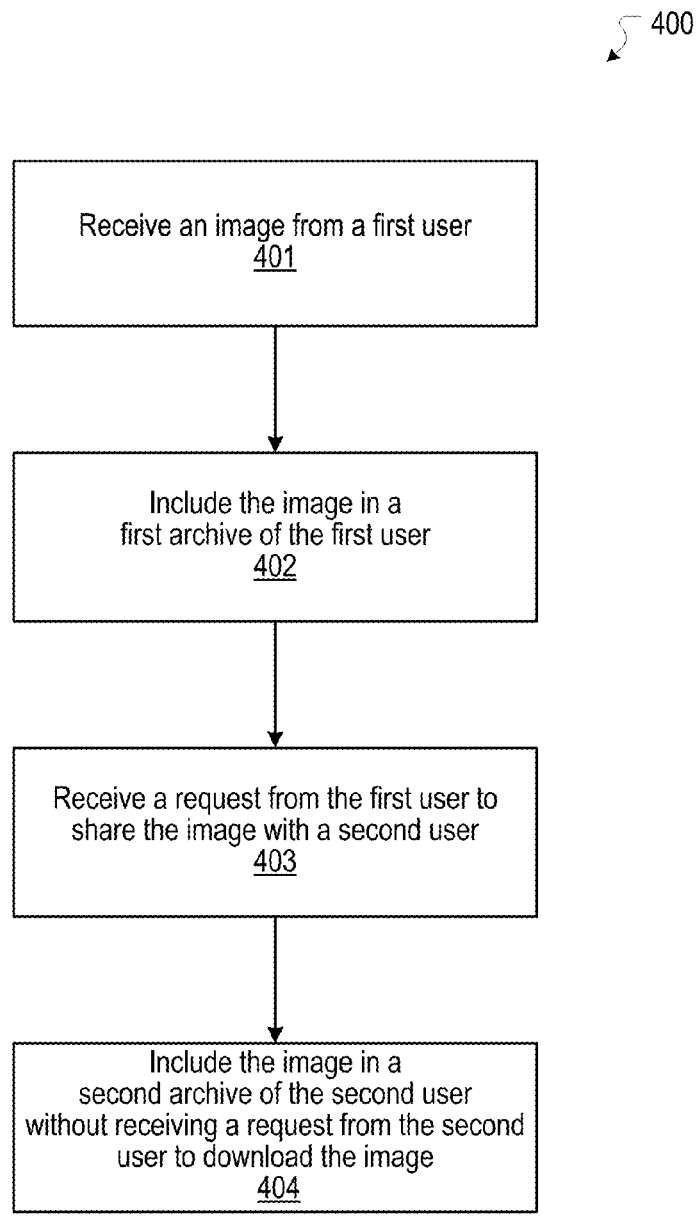
FIG. 4 illustrates a process for receiving a share of an image and including the image in an archive in accordance with an embodiment of the invention.

FIG. 4 illustrates a process 400 for receiving a request to share an image and including the image in an archive in accordance with an embodiment of the invention. At block 401, the social networking system 130 receives an image from a first user. In an embodiment, the image may be received from a user device 110. In an embodiment, the user device 110 may be a mobile device and the image may have been captured using a camera of the mobile device. At block 402, the social networking system 130 includes the image in a first archive of the first user. At block 403, the social networking system 130 receives a request from the first user to share the image with a second user of the social networking system 130. Sharing the image may comprise tagging the second user in the image, sending a message to the second user including links to the image, or any other technique for the first user granting access to the image to the second user. At block 404, the social networking system 130 includes the image in a second archive of the second user without receiving a request to download the image from the second user. In an embodiment, the social networking system 130 may create a link to the image in the second archive. As discussed above, the link may be a URL, a pointer, or other reference that is associated with the image. The use of the link obviates the need to create a copy of the image for each archive with which it is associated. In an embodiment, the social networking system 130 may create a copy of the image for the second archive.

Figure 5:
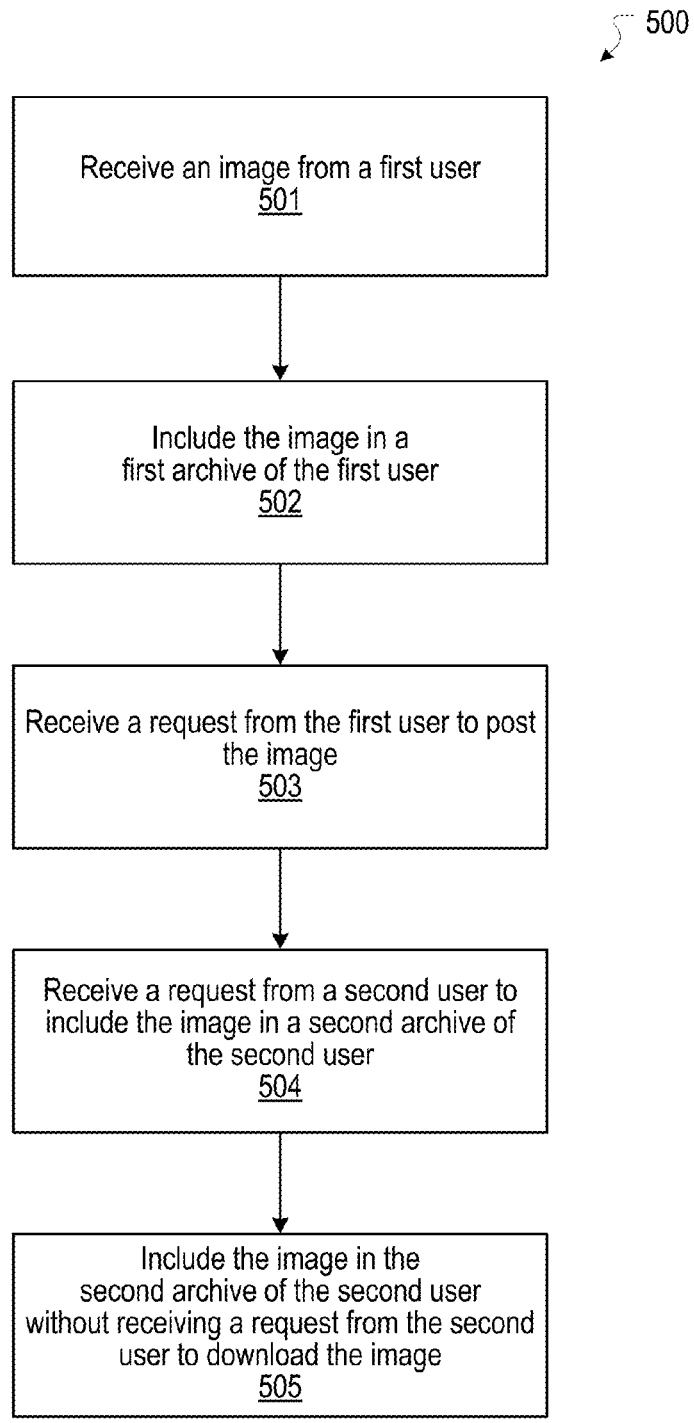
FIG. 5 illustrates a process for receiving a post of an image and including the image in an archive in accordance with an embodiment of the invention.

FIG. 5 illustrates a process 500 for receiving a request to post an image and including the image in an archive in accordance with an embodiment of the invention. At block 501, the social networking system 130 receives an image from a first user. In an embodiment, the image may be received from a user device 110. In an embodiment, the user device 110 may be a mobile device and the image may have been captured using a camera of the mobile device. At block 502, the social networking system 130 includes the image in a first archive of the first user. At block 503, the social networking system 130 receives a request from the first user to post the image. In an embodiment, the image may be posted to or published in the first user's or another user's profile (or wall), timeline, news feed, or other page within the social networking system 130. At block 504, the social networking system 130 receives a request from a second user to include the image in a second archive of the second user. The second user may have seen the image in his news feed and selected an option to include the image in his archive. In an embodiment, selection of the option by the second user may cause the social networking system 130 to include the image in the archive of the second user without the social networking system 130 downloading the image to a user device of the second user. The second user may select the option to include the image in his archive by taking any one of myriad actions, including adding the image to an album, 'liking' the image, tagging himself in the image, or otherwise interacting with the image. At block 505, the social networking system 130 includes the image in the second archive of the second user without receiving a request to download the image from the second user. In an embodiment, the social networking system 130 may create a link to the image in the second archive. As discussed above, the link may be a URL, a pointer, or other reference that is associated with the image. The use of the link obviates the need to create a copy of the image for each archive with which it is associated. In an embodiment, the social networking system 130 may create a copy of the image for the second archive.

FIG. 6A illustrates a camera view 611 within an interface 600 of a camera application on a mobile device 601 in accordance with an embodiment of the invention. In an embodiment, the mobile device 601 may be the user device 110. In the illustrated example, a user is capturing an image 610 of a tree from within the camera view 611 using a camera of the mobile device 601. Upon pressing a shutter button 602, the image 610 is captured and saved to a local storage module within the mobile device 601, such as the storage module 126. Upon capturing the image 610, the user may access the social networking application 118. FIG. 6B illustrates an uploading view 612 within an interface 613 of the social networking application 118 on the mobile device 601 in accordance with an embodiment of the invention. In the illustrated example, a user Denard Henne has accessed the uploading view 612 to view the upload status of 20 images, including the image 610. The uploading view 612 includes an upload status bar 614 indicating that camera images are being automatically uploaded to the social networking system 130. In an embodiment, the social networking application 118 caused the images to be automatically uploaded upon capture of each image without further action by the user. In an embodiment, the automatic uploading may be initiated upon the user accessing the social networking application 118. The uploading view 612 also includes a thumbnail 615 of the image 610 indicating the image 610 is currently being uploaded to the social networking system 130.

Figure 6D:
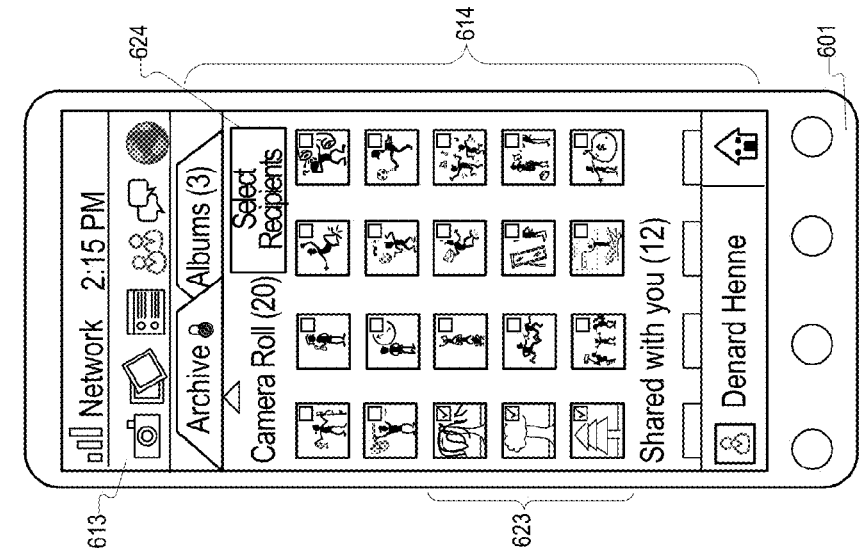
FIG. 6D illustrates the gallery view showing a select image mode within the interface of the social networking application on the mobile device in accordance with an embodiment of the invention.
Figure 6C:
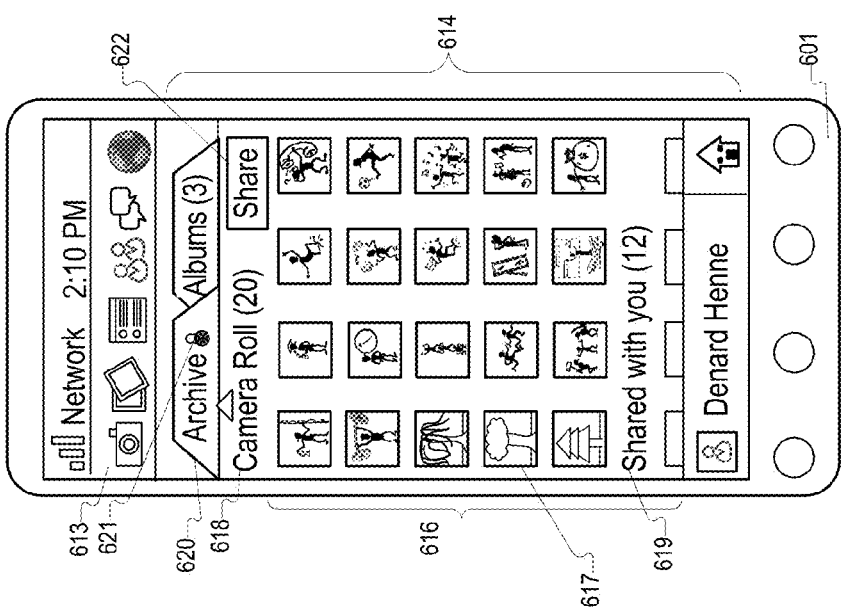
FIG. 6C illustrates a gallery view within the interface of the social networking application on the mobile device in accordance with an embodiment of the invention.

FIG. 6C illustrates a gallery view 614 within the interface 613 of the social networking application 118 on the mobile device 601 in accordance with an embodiment of the invention. In the illustrated example, the gallery view 614 includes an archive tab 620 that displays an archive view 616 of the user Denard Henne's archive within the social networking system 130. The archive view 616 shows thumbnails of the images uploaded from the user's mobile device 601. The archive view 616 includes a thumbnail 617 of the image 610 within a "Camera Roll" subsection 618 of the archive. The archive view 616 also includes a "Shared With You" subsection 619, which includes the images that have been shared with the user Denard Henne by other users of the social networking system 130 and that the user Denard Henne has saved to his archive. A lock symbol 621 indicates that the archive is only visible to the user Denard Henne. The images may be shared by selecting a "Share" option 622.

FIG. 6D illustrates the gallery view 614 showing a select image mode within the interface 613 of the social networking application 118 on the mobile device 601 in accordance with an embodiment of the invention. The select image mode may be accessed by selecting the "Share" option 622 in FIG. 6C, which may cause check boxes or any other type of user interface element or icon to appear on each of the thumbnails displayed within the gallery view 614. In an embodiment, an image may be designated for sharing by selecting, for example, the checkbox corresponding to the image. In the illustrated example, the user Denard Henne has designated images corresponding to three thumbnails 623, including the image 610 corresponding to the thumbnail 617, for sharing. Users with whom the images are shared may be designated by selecting a "Select Recipients" option 624.

FIG. 6E illustrates a "Select Recipients" view 625 within the interface 613 of the social networking application 118 on the mobile device 601 in accordance with an embodiment of the invention. The "Select Recipients" view 625 includes a user list 626 and a search interface 627. In an embodiment, the user list 626 may include a list of users of the social networking system 130 with check boxes next to each user's name. The user may enter terms into the search interface 627 to display specific users within the user list 626. In an embodiment, the user may search his friends list or all users of the social networking system 130 using the search interface 627. The user may select recipients by selecting a check box next to a user's name. In the illustrated example, the user Denard Henne has selected a user Rick Navarre with whom to share the images. The user may proceed by selecting a "Compose Message" option 628.

FIG. 6F illustrates a compose message view 629 within the interface 613 of the social networking application 118 on the mobile device 601 in accordance with an embodiment of the invention. The compose message view 629 may be accessed by selecting the "Compose Message" option 628. The compose message view 629 includes thumbnails 631 of the three images designated for sharing in the select image mode, including a thumbnail 632 of the image 610. The compose message view 629 includes a message body field 630 that allows the user to compose a message to be included with the images he has designated for sharing. In the illustrated example, the user Denard Henne has typed the text "Check out these trees!" to include with the images he is sharing with the user Rick Navarre. The user may complete the sharing process by selecting a send option 633. The compose message view 629 also includes a publicize option 634 which, if selected, may make the shared images accessible to all of the user's friends or all other users of the social networking system 130. If selected, the publicize option 634 may cause the images to appear in the news feeds of the user's friends when the send option 633 is selected.

Figure 7A:
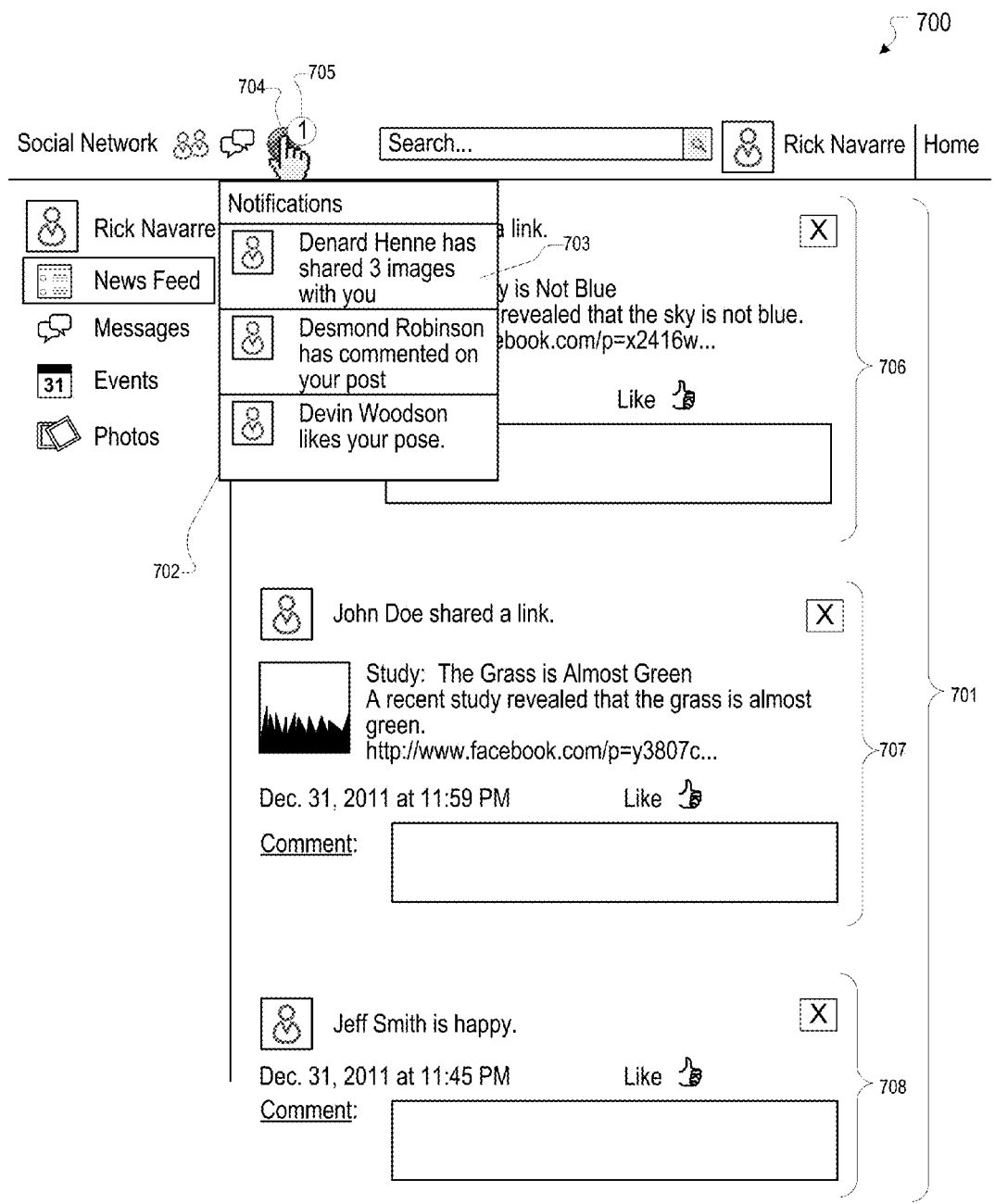
FIG. 7A illustrates a news feed view of an interface of the social networking system in accordance with an embodiment of the invention.

FIG. 7A illustrates a news feed view 701 of an interface 700 of the social networking system 130 in accordance with an embodiment of the invention. The news feed view 701 depicts a news feed with three news stories 706, 707, and 708 and a notification window 702 of the user Rick Navarre. The notification window 702 may be accessed by selecting a notifications icon 704. A notifications badge 705 indicates the number of new notifications the user has received. In the illustrated example, the user Rick Navarre has received one new notification 703 indicating that the user Denard Henne has shared three images with him. In an embodiment, a news story may be displayed within the news feed view 701 indicating to a second user that a first user has shared an image with the second user. In an embodiment, a news story may be displayed within the news feed view 701 indicating to the second user that the first user has posted an image on the first user's profile.

Figure 7B:
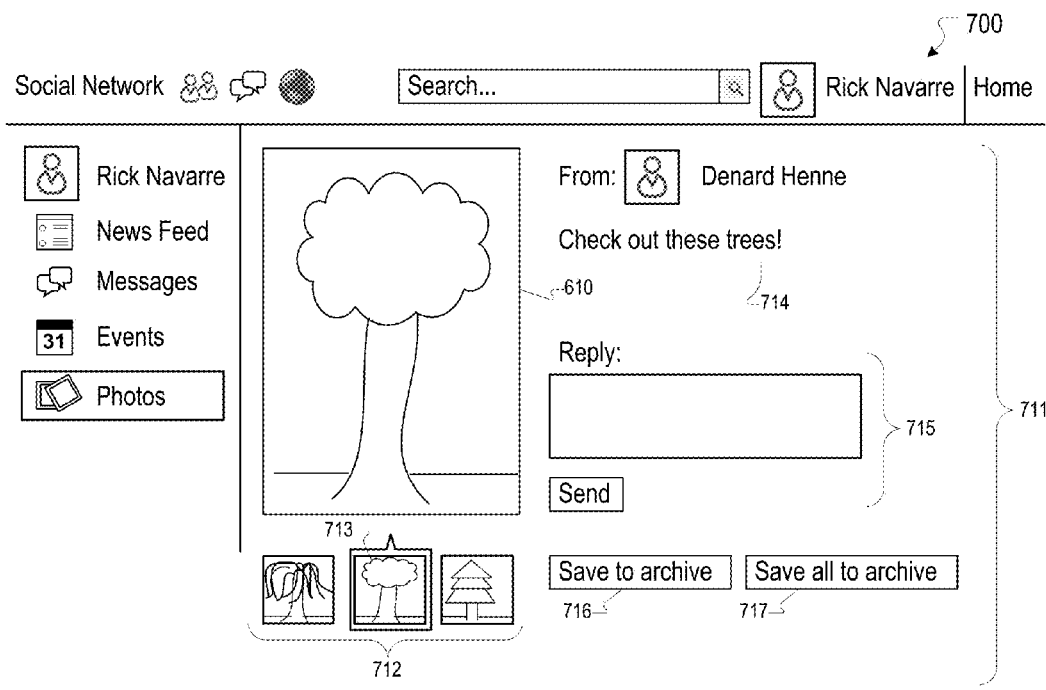
FIG. 7B illustrates a photos view of the interface of the social networking system in accordance with an embodiment of the invention.
Figure 7C:
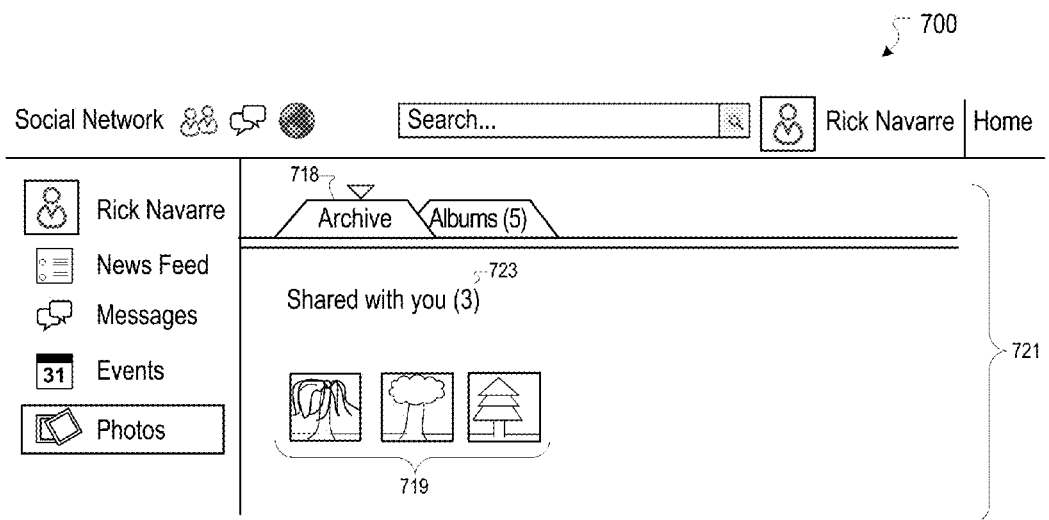
FIG. 7C illustrates the photos view of the interface of the social networking system showing an archive of a user.

FIG. 7B illustrates a photos view 711 of the interface 700 of the social networking system 130 in accordance with an embodiment of the invention. The photos view 711 includes the images shared by the user Denard Henne with the user Rick Navarre. The three thumbnails 712, including the thumbnail 713 of the image 610, correspond to the three images shared by the user Denard Henne with the user Rick Navarre. Thumbnail 713 is highlighted, indicating that the image 610 is the image currently displayed. The photos view 711 includes text 714 composed by the user Denard Henne to accompany the shared images. The photos view 711 includes a reply field 715 for the user Rick Navarre to compose a reply to the user Denard Henne. In an embodiment, the user may save a currently displayed image that has been shared with him in his archive by selecting a "Save to archive" option 716. In an embodiment, the user may save all images that have been shared with him in a message by selecting a "Save all to archive" option 717. Selecting option 716 or option 717 allows the user to include the image in his own archive without having to download and re-upload the image to the social networking system 130. In the illustrated example, the user Rick Navarre has selected the "Save all to archive" option 717. FIG. 7C illustrates the photos view 721 of the interface 700 of the social networking system 130 including an archive tab 718 showing an archive of the user Rick Navarre in accordance with an embodiment of the invention. The archive includes the three images shared with the user Rick Navarre by the user Denard Henne, indicated by the thumbnails 719, in a "Shared With You" subsection 723 of the archive.

Hardware Implementation

Figure 8:
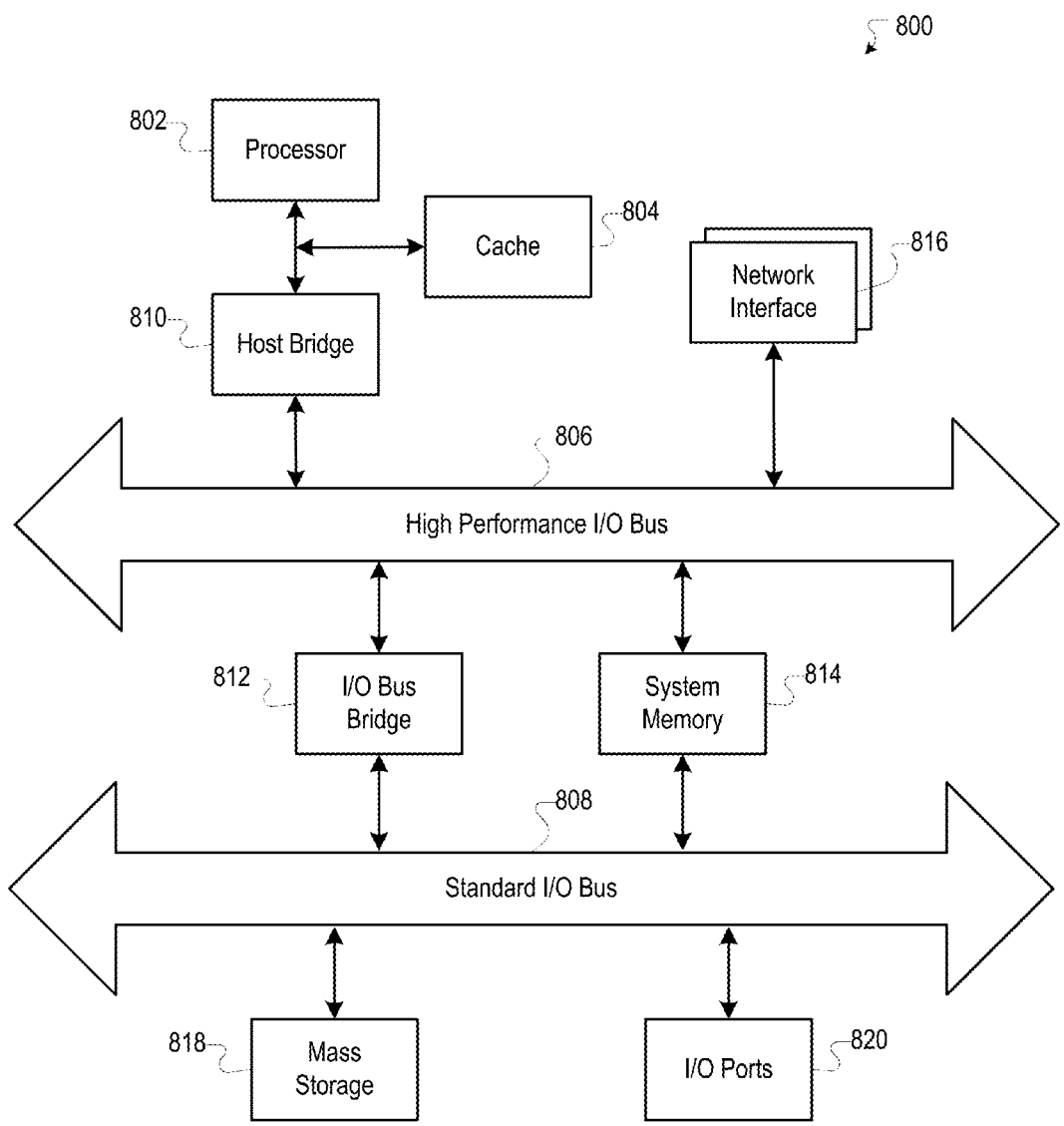
FIG. 8 illustrates an example of a computer system that may be used to implement one or more of the embodiments described herein in accordance with an embodiment of the invention The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 130, the user device 110, and the external system 120, or a component thereof. In an embodiment of the invention, the computer system 800 may be one server among many that constitutes all or part of the social networking system 130.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Furthermore, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer implement method comprising:
receiving, by a computer system, an image from a first user;
associating, by the computer system, the image with a first online archive of the first user within a social networking system;
receiving, by the computer system, a request from a second user to associate the image with a second online archive of the second user within the social networking system; and
in response to the request from the second user, associating, by the computer system, the image with the second online archive of the second user within the social networking system, thereby saving the image to the second online archive independent of the first online archive and providing the second user with persistent access to the image, without receiving a request from the second user to download the image.

2. The computer implemented method of claim 1, wherein the first user and the second user are friends within the social networking system.

3. The computer implemented method of claim 1, wherein the associating the image with the second archive is based on the second user being tagged in the image.

4. The computer implemented method of claim 1, wherein the image is received from a mobile device.

5. The computer implemented method of claim 1, wherein the image is captured by a camera of a mobile device.

6. The computer implemented method of claim 1, wherein the image is automatically uploaded from a mobile device.

7. The computer implemented method of claim 1, wherein the image is automatically uploaded when a social networking application of a mobile device is running.

8. The computer implemented method of claim 1, further comprising receiving a request by the first user to share the image with the second user.

9. The computer implemented method of claim 8, wherein the receiving the request by the first user to share the image with the second user comprises receiving a tag of the second user.

10. The computer implemented method of claim 8, wherein the receiving the request by the first user to share the image with the second user comprises receiving a message from the first user.

11. The computer implemented method of claim 1, wherein the associating the image with the second archive of the second user comprises including a link to the image in the second archive.

12. The computer implemented method of claim 1, wherein the associating the image with the first archive of the first user comprises including a link to the image in the first archive.

13. The computer implemented method of claim 12, further comprising deleting the link to the image in the first archive.

14. The computer implemented method of claim 13, further comprising maintaining a link to the image in the second archive.

15. The computer implemented method of claim 1, further comprising receiving a request by the first user to share the image with a third user subject to privacy settings.

16. The computer implemented method of claim 1, wherein the image is received from at least one of a photo scanning service and a third party image sharing service.

17. The computer implemented method of claim 1, further comprising sending a notification for the first user indicating that the image has been associated with the first archive associated with the first user.

18. A system comprising:
at least one processor; and
a memory storing instructions configured to instruct the at least one processor to perform:
  receiving, by a computer system an image from a first user;
  associating, by the computer system, the image with a first online archive of the first user within a social networking system;
  receiving, by the computer system, a request from a second user to associate the image with a second online archive of the second user within the social networking system; and
  in response to the request from the second user, associating, by the computer system, the image with the second online archive of the second user within the social networking system, thereby saving the image to the second online archive independent of the first online archive and providing the second user with persistent access to the image, without receiving a request from the second user to download the image.

19. A non-transitory computer storage medium storing computer-executable instructions that, when executed, cause a computer system to perform a computer-implemented method comprising:
  receiving, by a computer system an image from a first user;
  associating, by the computer system, the image with a first online archive of the first user within a social networking system;
  receiving, by the computer system, a request from a second user to associate the image with a second online archive of the second user within the social networking system; and
  in response to the request from the second user, associating, by the computer system, the image with the second online archive of the second user within the social networking system, thereby saving the image to the second online archive independent of the first online archive and providing the second user with persistent access to the image, without receiving a request from the second user to download the image.

* * * * *